June 1, 1926.

J. LEDWINKA 1,587,006

CONCEALED EMERGENCY SEAT STRUCTURE FOR AUTOMOBILES

Filed Nov. 6, 1919     4 Sheets-Sheet 1

INVENTOR
Joseph Ledwinka
BY
Samuel E. Darby
ATTORNEY

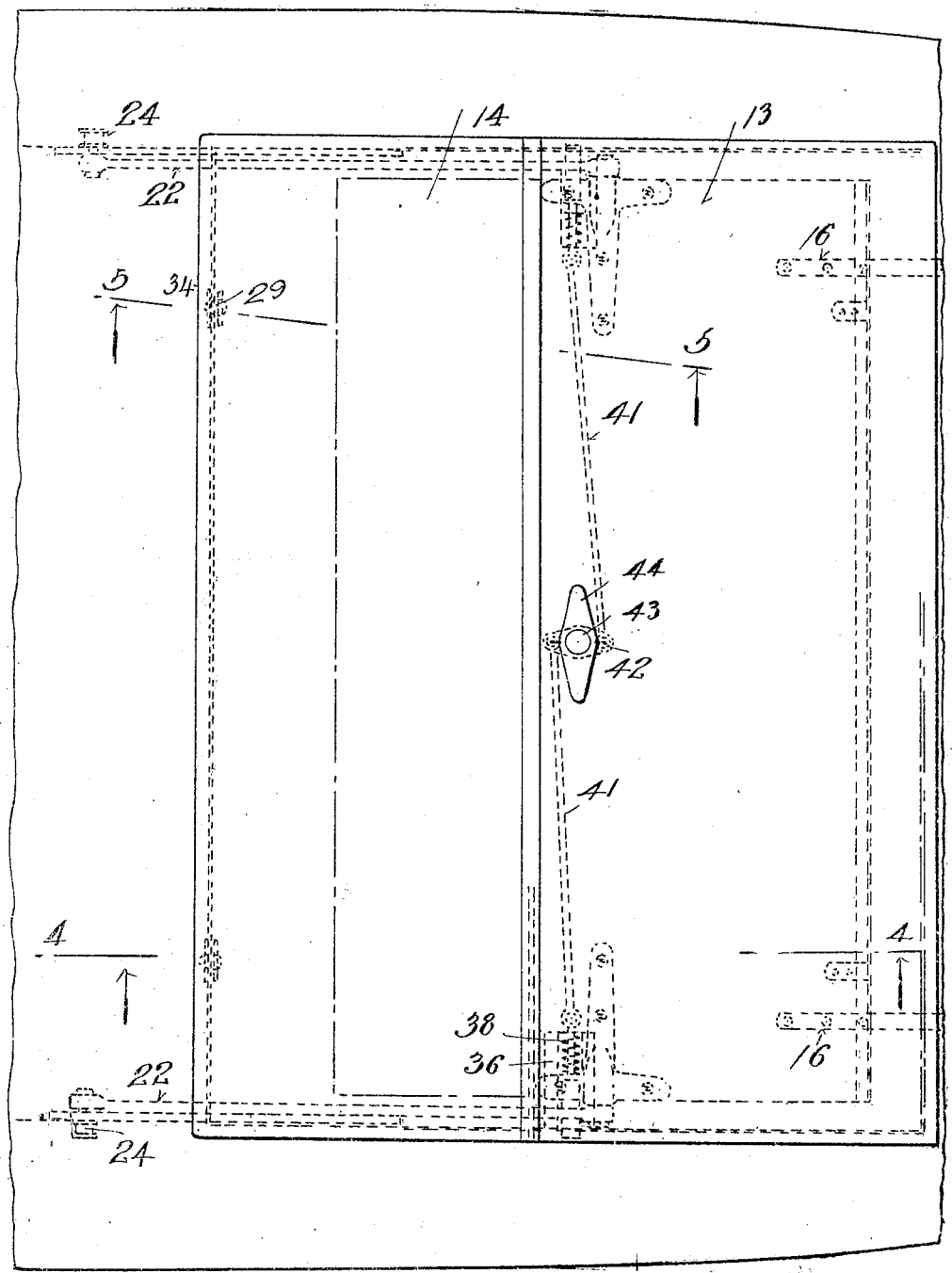

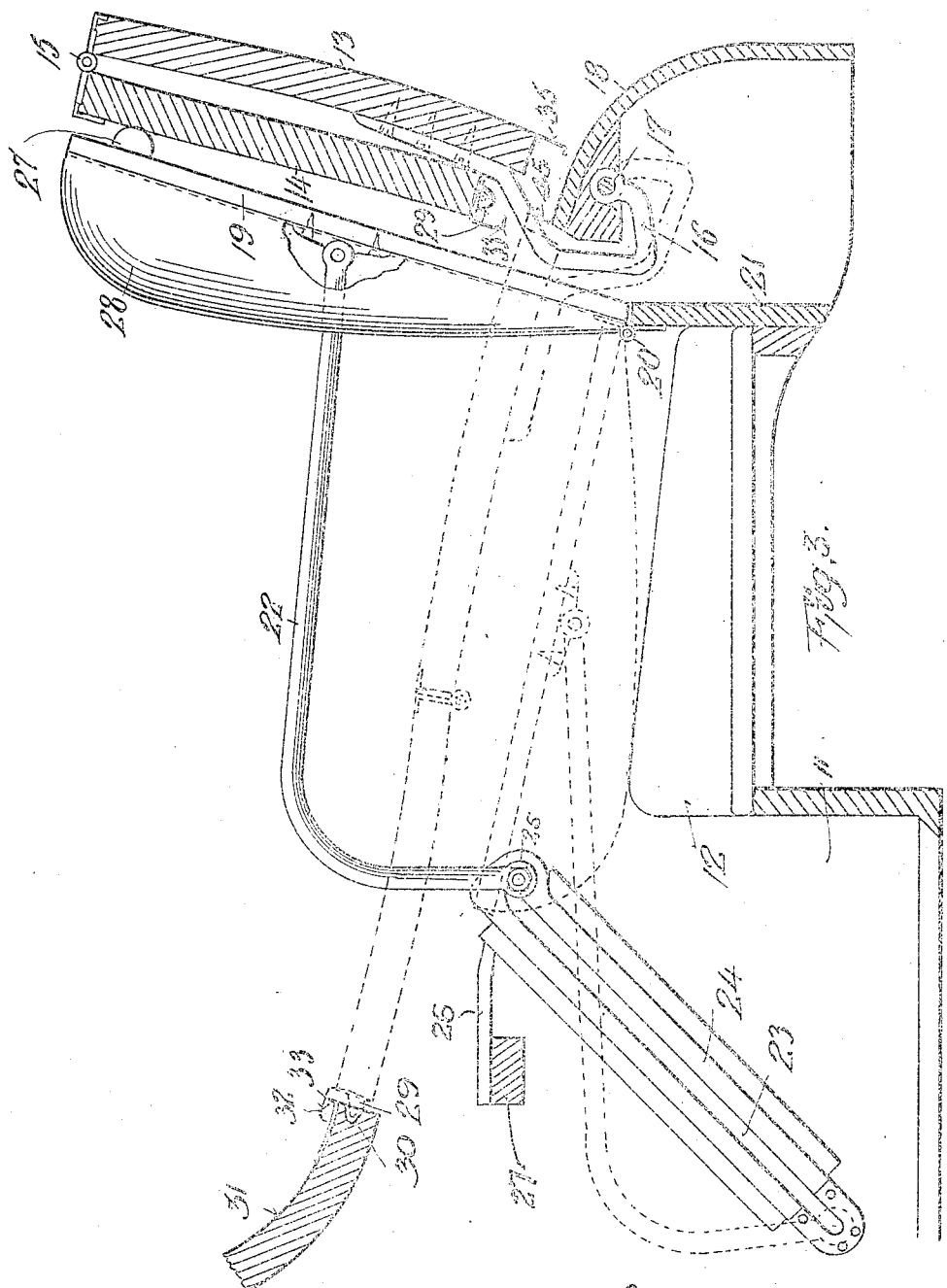

June 1, 1926.
J. LEDWINKA
1,587,006
CONCEALED EMERGENCY SEAT STRUCTURE FOR AUTOMOBILES
Filed Nov. 6, 1919 4 Sheets-Sheet 4
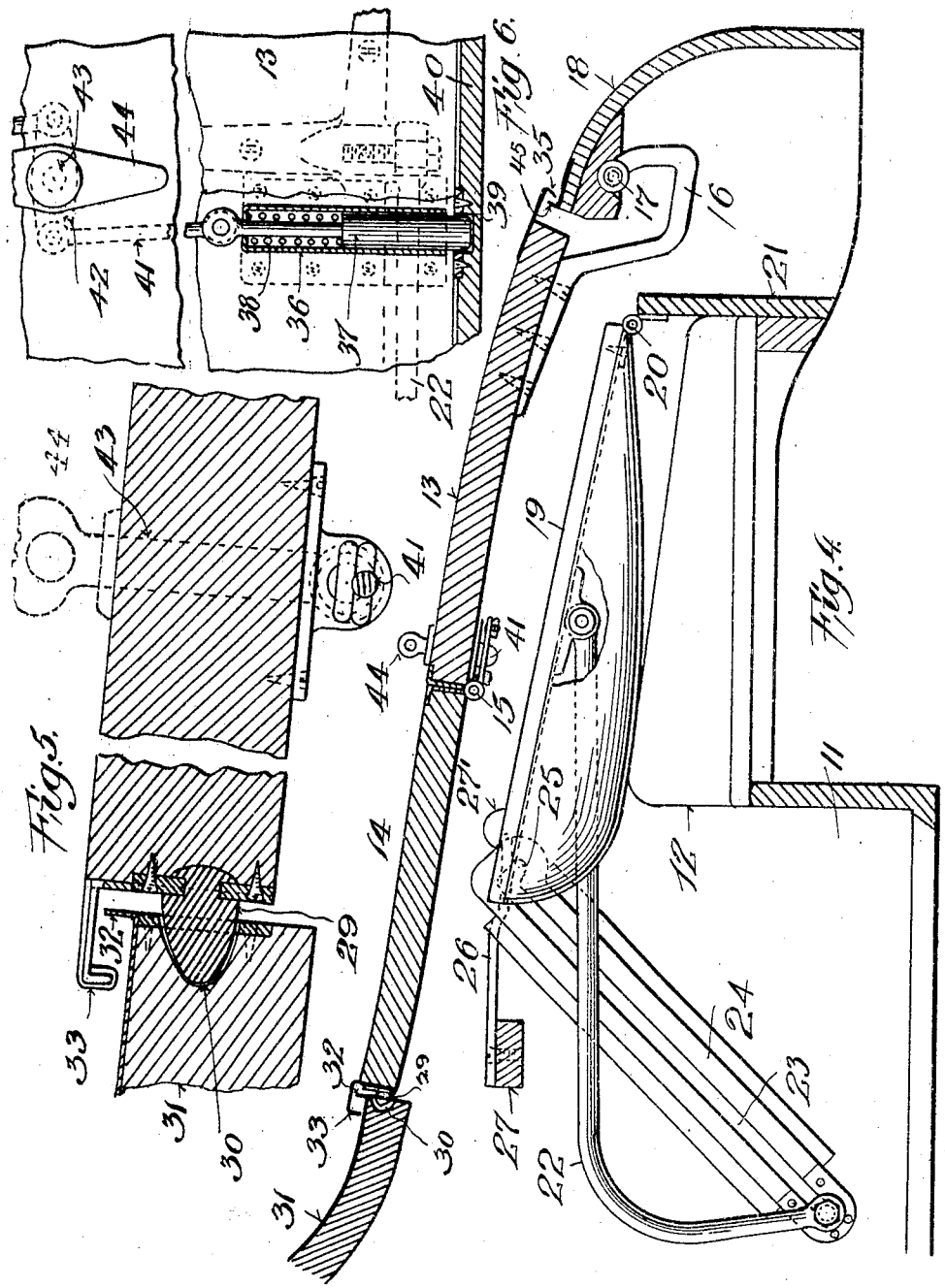
Joseph Ledwinka PROPRIETOR
BY Samuel E Darby ATTORNEY Patented June 1. 1926.

1,587,006

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CONCEALED EMERGENCY SEAT STRUCTURE FOR AUTOMOBILES.

Application filed November 6, 1919. Serial No. 336,057.

This invention relates to concealed emergency seat structures for automobiles.

The object of the invention is to provide an emergency seat structure for automobiles which normally is concealed but which may be raised into position for use, and when raised into position is efficiently retained in such position.

A further object of the invention is to provide a folding cover section for the rear portion of the box frame body for automobiles, which in normal position closes a seating space, but which when raised into position for use constitutes a seat back for use in connection with a seat contained in said seating space.

A further object of the invention is to provide suitable means for guiding the hinged or folding cover for a concealed seat when moved to and from position for use, and means for releasably locking or retaining said folding cover when in normal position to conceal the seat.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the accompanying drawings,—

Fig. 2 is a broken view in top plan of the rear portion of the automobile shown in Fig. 1 indicating the application thereto of a concealed emergency seat embodying the invention.

Figs. 3 and 4 are views in vertical section on the line 4, 4, Fig. 2, looking in the direction of the arrows, parts broken off, the former showing the emergency seat structure in open position ready for use, and the latter showing the parts in closed or concealed position.

Fig. 5 is a broken detail view in section on the line 5, 5, Fig. 2, looking in the direction of the arrows.

Fig. 6 is a broken detail view in top plan, the locking bolt structure for locking the combined seat back and cover in closed position being shown in section.

The same part is designated by the same reference character wherever it occurs throughout the several views.

Figure 1:
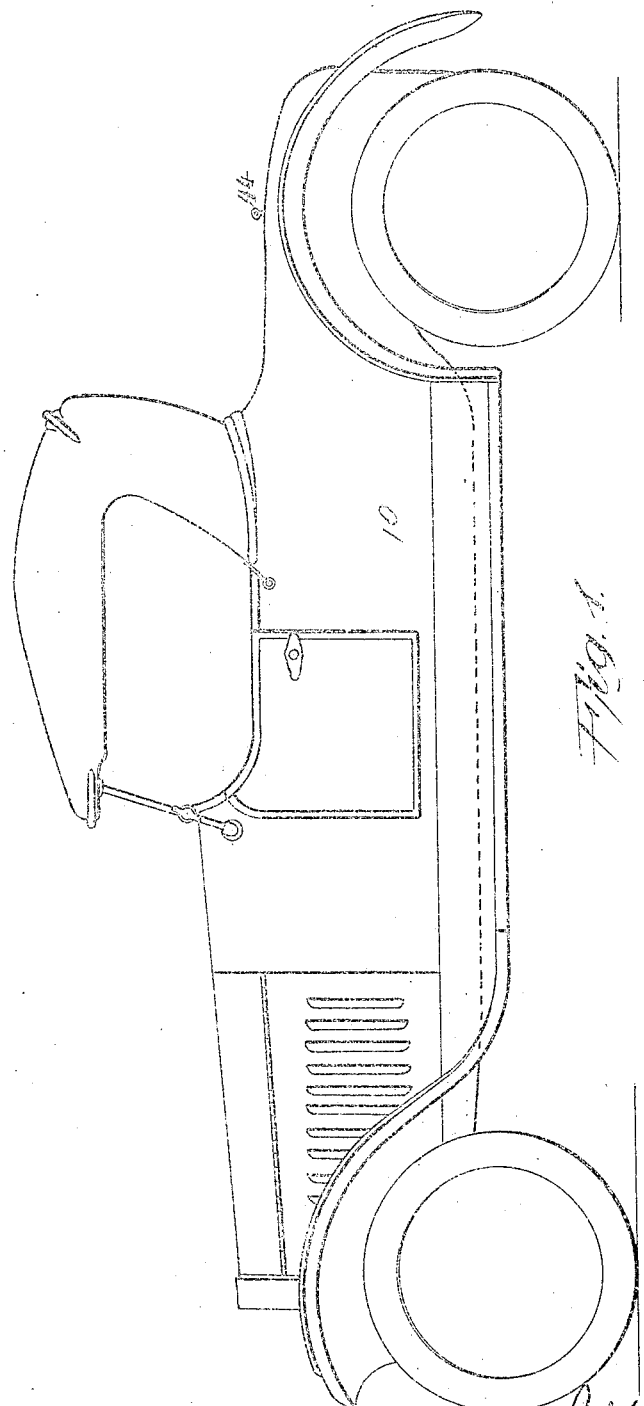
Fig. 1 is a view in side elevation of one type of automobile to which the concealed emergency seat structure embodying my invention is applied.

In accordance with the principles of my invention I construct the rear portion of the body of an automobile, as for example, an automobile of the roadster type, with a seating space designed to contain an emergency seat, and I provide a cover for this space which when in closed position conceals the seat and seating space. I form this cover preferably in folding sections, that is, sections which fold upon each other and which may rock or swing into vertical position when it is desired to use the concealed emergency seat, and when in raised position adapted to form a rest or support for a seat back. I also propose to employ means for efficiently retaining the hinged or folding cover sections in proper position when closed to conceal the seat and its back cushion and to enclose the emergency seating space, and to prevent looseness and consequent rattle or shaking of the parts. I also propose to provide means for efficiently but detachably locking the hinged or folding sections when in their closed position, and also to provide efficient means for suitably guiding the swinging or folding cover sections into their raised or lowered position and to retain the same in their raised position when required for use.

Referring to the drawings in which I have shown a concealed emergency seat structure embodying the principles of my invention, reference numeral 10 designates an automobile, which, in this instance, is in appearance of the roadster type, having a rear box frame portion containing a space 11 in which is arranged the emergency seat 12. A cover for closing the space 11 and concealing the seat 12 consists of the sections 13, 14, which are suitably hinged together as at 15, the section 13 being connected to brackets 16 which are hinged as at 17 to the stationary part of the automobile body as indicated at 18. The seat back 19 is hinged as at 20 to a stationary part 21 of the frame adjacent the rear portion of the seat and normally when the seat is concealed is folded down upon the seat as shown in full lines in Fig. 4 and in dotted lines in Fig. 3. When the cover portions 13, 14, are rocked or swung into raised position for the use of the emergency seat the back 19 is rocked upon its pivot 20 so as to lie against the raised and folded portions 13, 14, as clearly indicated in Fig. 3. In order to properly guide the seat back in its swinging movements and to retain the same in its raised position for use said seat back has attached thereto at its opposite ends suitable arms 22, which arms at their free ends engage in suitable guide channels 23 carried by brackets 24 mounted upon the side walls of the seat space 11 and in inclined relation so as to permit the arms 22 to be guided when the seat back is rocked or swung about its pivot. The upper ends of the guide channels 23 are provided with offset seats indicated in dotted lines in Fig. 4 into which extensions from the ends of arms 22 are received when the seat back is in its raised position. Suitable spring fingers 26 suitably mounted as by means of lugs 27 on the side walls of space 11 engage the projections from the ends of arms 22 when received in the offset seats 25 and retain the same in place, thus efficiently retaining the seat back in its raised position. The seat back is provided on its back surface with a bumper 27', which when said seat back is rocked into its raised position abuts against the adjacent surface of the cover portion 14 and hence retains the cover portions 13 and 14 in their raised position. If desired, the seat back may be equipped with the usual or any desired form of upholstery or cushioning devices indicated at 28.

At its front edge the swinging and folding section 14 of the cover is provided with tapered blocks or bumpers indicated at 29, which, when the cover sections 13, 14, are rocked or swung into closed position to enclose the space 11 and conceal the seat, are received in correspondingly shaped pockets or recesses 30 in the rear edge of the stationary part 31 of the automobile body, thereby efficiently retaining the cover sections in their closed position, and by becoming wedged into the sockets 30 said blocks prevent rattle of the cover sections. The rear edge of the stationary part 31 of the automobile body is provided with a raised rib or flange 32 over which engages an angle part 33 carried by the front edge of section 14 of the cover, thereby forming a water shed device to prevent the ingress of water through the joint between the stationary part 31 of the frame and the cover section when in closed position. Likewise, the stationary part 18 of the frame is provided with an upturned lip or rib 45 with which cooperates the corresponding overhanging flange portion 35 on the rear edge of the section 13 of the top to prevent ingress of water into the space occupied by the concealed seat when the cover is in its closed position.

In order to detachably lock the cover sections 13, 14, when in their closed position, I provide the side edges of the section 13 of the cover with transversely extending barrels 36, see Fig. 6, in which are positioned locking plungers 37 yieldingly urged outwardly by means of coil springs 38 into sockets or recesses 39 in the side walls 40 of the seating space 11 when the top section 13 is in its closed position. The locking plungers 37 are connected by rods 41 to opposite ends of a rock arm 42 carried by a stud 43 having a handle portion 44 by means of which said stud 43 may be rocked to withdraw the locking plungers 37 from engagement in the locking sockets 39 when it is desired to raise the cover portions. The handle 44 also affords convenient means by which the sections 13, 14 of the cover may be moved into their raised or lowered into their closed position.

The operation is exceedingly simple. Assuming the parts to be in their normal closed position, as shown in Fig. 4, when it is desired to utilize the concealed emergency seat the hand piece 44 is grasped and rotated so as to withdraw the locking bolts 37 and release the cover sections. By then raising on the hand piece 44 the cover section 13 is rocked or swung about its pivot 17 towards raised position while the cover section 14 is initially withdrawn rearwardly to disengage the bumper blocks 29 from their sockets 30, and thereafter the section 14 of the cover rocks or swings back upon the section 13 while the latter rocks or swings into vertical position. In practice the hinge brackets 16 are so disposed with respect to the pivotal axes thereof that when the cover sections 13, 14 are in their raised position they pass slightly beyond the dead center of the axes of pivots 17 and hence tend to remain in their raised position. After the cover sections 13, 14 are thus raised the seat back 19 is likewise raised or swung into vertical or raised position, the guide arms 22 being properly and suitably guided in the channels 23 until the projections on the arms 22 are received in the offset sockets or recesses 25. When in this position the spring fingers 26 engage behind the projections or arms 22 and retain the same and with them the seat back 19 in their raised positions. The emergency seat is thereby revealed and the automobile is converted from a single seated roadster into a double seated car. The parts now occupy the position indicated in full lines in Fig. 3. When the emergency seat is no longer required for use the spring fingers 26 are raised so as to release the projections or arms 22 and thereupon said projections are lifted out of the sockets 25 and the seat back is then permitted to be swung down upon the seat 12 into the space 11. The folding and swinging cover sections 13, 14, are then rocked or swung from their raised position into their closed position, the front edge of the section 14 becoming distended into line with section 13 with the bumper blocks 29 on the front edge thereof wedging into the sockets or recesses 30, thereby efficiently retaining these parts against rattle. When the sections 13, 14, attain their closed positions the locking bolts 37 snap into their locking seats 39 and thereby lock the parts in their closed positions as shown in Fig. 4.

Having now set forth the objects and nature of my invention, and a construction embodying the principles thereof, what I claim as new and useful and of my own invention and desire to secure by Letters Patent is,—

1. In a concealed emergency seat structure for automobiles, the combination with an automobile body having an emergency seating space, and a seat arranged therein, of a cover for said space, said cover being hinged to the body, projections carried by the cover, and seats formed in the body to receive said projections when the cover is closed, to hold the same against looseness or rattle.

2. In a concealed emergency seat structure for automobiles, the combination with an automobile body having an emergency seating space, and a seat arranged therein, of a cover for said space, said cover being hinged to the body, and cooperating projections and seats in the end surfaces of said cover and body at their meeting edges to hold the former against looseness and rattle when in closed position.

3. In a concealed emergency seat structure for automobiles, the combination with an automobile body having an emergency seating space, and a fixed seat bottom arranged therein, of a hinged back for said seat, guideways carried by the side walls of said seating space, and arms connected to the back and engaging in said guides.

4. In a concealed emergency seat structure for automobiles, the combination with an automobile body having an emergency seating space, and a fixed seat bottom arranged therein, of a hinged back for said seat, guideways carried by the side walls of said seating space, said guideways having offset seats at their upper ends, and arms connected to the back and engaging in said guides, and received in said offset seats when the seat back is raised into position for use.

5. In a concealed emergency seat structure for automobiles, the combination with an automobile body having an emergency seating space, and a fixed seat bottom arranged therein, of a hinged back for said seat, guideways carried by the side walls of said seating space, said guideways having offset seats at their upper ends, and arms connected to the back and engaging in said guides, and received in said offset seats when the seat back is raised into position for use, and means to retain said arms in said offset seats.

6. In a concealed emergency seat structure for automobiles, the combination with an automobile body having an emergency seating space, and a fixed seat bottom arranged therein, of a hinged back for said seat, guideways carried by the side walls of said seating space, said guideways having offset seats at their upper ends, and arms connected to the back and engaging in said guides, and received in said offset seats when the seat back is raised into position for use, and spring fingers to engage said arms and retain the same in said seats.

7. In a concealed emergency seat structure for automobiles, the combination with an automobile body having an emergency seating space, and a fixed seat bottom arranged therein, of a hinged back for said seat, said back hinged to the body to swing into said space when not required for use, and a cover to the body and adapted to swing into position to open or close said seating space, said seat back engaging said cover, when in position for use, to retain said cover in its open position.

8. The combination with an automobile body having a compartment with a top opening therein, of a fixed seat bottom mounted within said compartment, a seat back hinged to the body to swing into the compartment and upon said seat bottom when not required for use, and a hinged closure for said opening, said seat back being so mounted that, in its operative position, it retains the closure in open position.

9. The combination with an automobile body having a compartment with a top opening therein, of a fixed seat bottom mounted in said compartment, a seat back hinged to the body to swing into said compartment when not required for use, and a closure for said opening, said closure also hinged to said body, said seat back being so mounted that, in its operative position, it extends through said opening and engages the hinged closure retaining the latter in open position.

10. The combination with an automobile body having a compartment with a top opening therein, of a fixed seat bottom mounted in said compartment, a seat back hinged to the body to swing into said compartment when not required for use and a closure for said opening comprising a pair of sections hinged together and one of them hinged to the body, said seat back being so mounted that, in its operative position, it extends through said opening and engages said closure sections folded upon each other to retain the closure in open position.

11. The combination with an automobile body having a compartment with a top opening therein, of a seat arranged in said compartment and a closure for said opening, said closure comprising a pair of sections hinged together, one of said sections being hingedly connected to the body and the other having projections extending longitudinally from the end surface thereof and fitting in recesses formed in the body at one edge of said opening.

12. The combination with an automobile body having a compartment with a top opening therein, of a seat arranged in said compartment, a closure for said opening, said closure comprising a pair of sections hinged together, one of said sections being hingedly connected to the body and the other having projections extending in line therewith beyond the free edge thereof and adapted to be received in cooperating recesses in the body when said sections are in alignment with each other to close said compartment, and means for locking the closure to the body with the sections in alinement.

13. The combination with an automobile body having a compartment with a top opening therein, of a fixed seat bottom mounted in said compartment and a closure for said opening comprising a pair of sections hinged together and one of them hinged to the body, said closure sections being foldable to bring the forward section substantially parallel to and in front of the rear section in the open position of the closure.

14. The combination with an automobile body having a compartment with a top opening therein, of a fixed seat bottom mounted in said compartment, a seat back hinged in said compartment to swing down into said compartment and to a raised position in which it extends through said opening and a closure for said opening comprising a pair of sections hinged together, and one of them hinged to the body, said closure sections being foldable upon each other to bring the forward section substantially parallel to and in front of the rear section in the open position of the closure, said seat back, in its open or raised position, engaging the forward section to hold the closure sections against movement.

In testimony whereof I have hereunto set my hand on this 23rd day of October, A. D. 1919.

JOSEPH LEDWINKA.